(12) United States Patent
Tait et al.

(10) Patent No.: US 11,484,872 B2
(45) Date of Patent: Nov. 1, 2022

(54) PDO OR BMTZ LIGAND FOR SUPPORTED COORDINATED PT HYDROSILYLATION CATALYSTS

(71) Applicant: THE TRUSTEES OF INDIANA UNIVERSITY, Indianapolis, IN (US)

(72) Inventors: Steven L. Tait, Bloomington, IN (US); Linxiao Chen, Issaquah, WA (US)

(73) Assignee: The Trustees of Indiana University, Bloomington, IL (US)

( * ) Notice: Subject to any disclaimer, the term of this patent is extended or adjusted under 35 U.S.C. 154(b) by 0 days.

(21) Appl. No.: 17/012,215

(22) Filed: Sep. 4, 2020

(65) Prior Publication Data

US 2021/0069687 A1   Mar. 11, 2021

Related U.S. Application Data

(60) Provisional application No. 62/896,350, filed on Sep. 5, 2019.

(51) Int. Cl.
| | | |
|---|---|---|
| *C07F 7/18* | (2006.01) | |
| *B01J 31/22* | (2006.01) | |
| *B01J 31/18* | (2006.01) | |
| *B01J 31/26* | (2006.01) | |
| *B01J 23/10* | (2006.01) | |
| *B01J 21/04* | (2006.01) | |
| *B01J 23/02* | (2006.01) | |

(52) U.S. Cl.
CPC ........... *B01J 31/2234* (2013.01); *B01J 21/04* (2013.01); *B01J 23/02* (2013.01); *B01J 23/10* (2013.01); *B01J 31/183* (2013.01); *B01J 31/26* (2013.01); *C07F 7/1876* (2013.01); *B01J 2231/323* (2013.01); *B01J 2531/0205* (2013.01); *B01J 2531/828* (2013.01)

(58) Field of Classification Search
None
See application file for complete search history.

(56) References Cited

PUBLICATIONS

Sommer, L.; Pietrusza, E.; Whitmore, F., Peroxide-catalyzed addition of trichlorosilane to 1-octene. J. Am. Chem. Soc. 1947, 69, 188-188.
Pierce, O. R.; Kim, Y. K., Fluorosilicones as high temperature elastomers. Rubber Chem. Technol. 1971, 44, 1350-1362.
Marciniec, B.; Walczuk, E.; Blazejewska-Chadyniak, P.; Chadyniak, D.; Kujawa-Welten, M.; Krompiec, S.; Auner, N.; Weiss, J., Organosilicon Chemistry V—From Molecules to Materials. Wiley VCH, Weinheim 2003. (Book reference, will provide upon request.).
Morita, Y.; Tajima, S.; Suzuki, H.; Sugino, H., Thermally initiated cationic polymerization and properties of epoxy siloxane. J. Appl. Polym. Sci. 2006, 100, 2010-2019.
Beyou, E.; Babin, P.; Bennetau, B.; Dunogues, J.; Teyssie, D.; Boileau, S., New fluorinated polysiloxanes containing an ester function in the spacer. I. Synthesis and characterization. J. Polym. Sci., Part A: Polym. Chem. 1994, 32, 1673-1681.

(Continued)

*Primary Examiner* — Clinton A Brooks
(74) *Attorney, Agent, or Firm* — Barnes & Thornburg LLP; Scott Rothenberger

(57) ABSTRACT

The invention describes single-site metal catalysts such as Pt single-site centers on powdered oxide supports with a 1,10-phenanthroline-5,6-dione (PDO) or bis-pyrimidyltetrazine (BMTZ) ligand on powdered MgO, $Al_2O_3$, or $CeO_2$.

11 Claims, 6 Drawing Sheets

(56) References Cited

PUBLICATIONS

Iojoiu, C.; Abadie, M. J.; Harabagiu, V.; Pinteala, M.; Simionescu, B. C., Synthesis and photocrosslinking of benzyl acrylate substituted polydimethylsiloxanes. Eur. Polym. J. 2000, 36, 2115-2123.

Li, Z.; Qin, J.; Yang, Z.; Ye, C., Synthesis and structural characterization of a new polysiloxane with second-order nonlinear optical effect. J. Appl. Polym. Sci. 2004, 94, 769-774.

Sellinger, A.; Laine, R. M.; Chu, V.; Viney, C., Palladium-and platinum-catalyzed coupling reactions of allyloxy aromatics with hydridosilanes and hydridosiloxanes: Novel liquid crystalline/organosilane materials. J. Polym. Sci., Part A: Polym. Chem. 1994, 32, 3069-3089.

Drazkowski, D. B.; Lee, A.; Haddad, T. S.; Cookson, D. J., Chemical substituent effects on morphological transitions in styrene-butadiene-styrene triblock copolymer grafted with polyhedral oligomeric silsesquioxanes. Macromolecules 2006, 39, 1854-1863.

Tuchbreiter, A.; Werner, H.; Gade, L. H., "A posteriori" modification of carbosilane dendrimers and dendrons: their activation in core and branch positions Dalton Trans. 2005, 1394-1402.

Maciejewski, H.; Wawrzyńczak, A.; Dutkiewicz, M.; Fiedorow, R., Silicone waxes—synthesis via hydrosilylation in homo-and heterogeneous systems. J. Mol. Catal. A: Chem. 2006, 257, 141-148.

Troegel, D.; Stohrer, J., Recent advances and actual challenges in late transition metal catalyzed hydrosilylation of olefins from an industrial point of view. Coord. Chem. Rev. 2011, 255, 1440-1459.

Marciniec, B., Hydrosilylation: a comprehensive review on recent advances. Springer Science & Business Media: 2008; vol. 1. (Book reference, will provide upon request.).

Ganicz, T.; Pakula, T.; Stanczyk, W. A., Novel liquid crystalline resins based on MQ siloxanes. J. Organomet. Chem. 2006, 691, 5052-5055.

Boury, B.; Corriu, R. J.; Leclercq, D.; Mutin, P. H.; Planeix, J. M.; Vioux, A., Poly (vinylsilane): a precursor to silicon carbide. 1. Preparation and characterization. Organometallics 1991, 10, 1457-1461.

Mori, A.; Sato, H.; Mizuno, K.; Hiyama, T.; Shintani, K.; Kawakami, Y., A facile preparation and polymerization of 1, 1-difunctionalized disiloxanes. Chem. Lett. 1996, 25, 517-518.

O'brien, M. J., Polyether siloxane copolymer network compositions. U.S. Pat. No. 6,531,540: 2003.

Herzig, C.; Deubzer, B.; Huettner, D., Siloxane copolymers containing alkenyl groups, their preparation and use. U.S. Pat. No. 5,241,034: 1993.

Jyono, H.; Odaka, H.; Ito, H.; Iwakiri, H., Curable composition. U.S. Pat. No. 6,444,775: 2002.

Watabe, T.; Matsumoto, T.; Onoguchi, T.; Tsuruoka, K., Room temperature-setting compositions. U.S. Pat. No. 6,207,766: 2001.

Jerschow, P., Silicone elastomers. Smart Publications: 2001; vol. 137. (Book reference, will provide upon request.).

Morris, R. H., Asymmetric hydrogenation, transfer hydrogenation and hydrosilylation of ketones catalyzed by iron complexes. Chem. Soc. Rev. 2009, 38, 2282-2291.

Langlotz, B. K.; Wadepohl, H.; Gade, L. H., Chiral bis (pyridylimino) isoindoles: A highly modular class of pincer ligands for enantioselective catalysis. Angew. Chem. Int. Ed. 2008, 47, 4670-4674.

Bart, S. C.; Lobkovsky, E.; Chirik, P. J., Preparation and molecular and electronic structures of iron (0) dinitrogen and silane complexes and their application to catalytic hydrogenation and hydrosilation. J. Am. Chem. Soc. 2004, 126, 13794-13807.

Vankelecom, I.; Jacobs, P., Dense organic catalytic membranes for fine chemical synthesis. Catal. Today 2000, 56, 147-157.

Xue, M.; Li, J.; Peng, J.; Bai, Y.; Zhang, G.; Xiao, W.; Lai, G., Effect of triarylphosphane ligands on the rhodium-catalyzed hydrosilylation of alkene. Appl. Organomet. Chem. 2014, 28, 120-126.

Igarashi, M.; Matsumoto, T.; Kobayashi, T.; Sato, K.; Ando, W.; Shimada, S.; Hara, M.; Uchida, H., Ir-catalyzed hydrosilylation reaction of allyl acetate with octakis (dimethylsiloxy) octasilsesquioxane and related hydrosilanes. J. Organomet. Chem. 2014, 752, 141-146.

Dong, H.; Jiang, Y.; Berke, H., Rhenium-mediated dehydrogenative silylation and highly regioselective hydrosilylation of nitrile substituted olefins. J. Organomet. Chem. 2014, 750, 17-22.

Wu, J. Y.; Stanzl, B. N.; Ritter, T., A strategy for the synthesis of well-defined iron catalysts and application to regioselective diene hydrosilylation. J. Am. Chem. Soc. 2010, 132, 13214-13216.

Glaser, P. B.; Tilley, T. D., Catalytic hydrosilylation of alkenes by a ruthenium silylene complex. Evidence for a new hydrosilylation mechanism. J. Am. Chem. Soc. 2003, 125, 13640-13641.

Nozakura, S.; Konotsune, S., Cyanoethylation of Trichlorosilane. II. α-Addition. Bull. Chem. Soc. Jpn. 1956, 29, 326-331.

Bareille, L.; Becht, S.; Cui, J. L.; Le Gendre, P.; Moïse, C., First Titanium-Catalyzed anti-1, 4-Hydrosilylation of Dienes. Organometallics 2005, 24, 5802-5806.

Harder, S.; Brettar, J., Rational Design of a Well-Defined Soluble Calcium Hydride Complex. Angew. Chem. Int. Ed. 2006, 45, 3474-3478.

Leich, V.; Spaniol, T. P.; Maron, L.; Okuda, J., Hydrosilylation catalysis by an earth alkaline metal silyl: synthesis, characterization, and reactivity of bis (triphenylsilyl) calcium. Chem. Commun. 2014, 50, 2311-2314.

Speier, J. L.; Webster, J. A.; Barnes, G. H., The addition of silicon hydrides to olefinic double bonds. Part II. The use of group VIII metal catalysts. J. Am. Chem. Soc. 1957, 79, 974-979.

Karstedt, B., Platinum complexes of unsaturated siloxanes and platinum containing organopolysiloxanes. U.S. Pat. No. 3,775,452: 1973.

Galeandro-Diamant, T.; Zanota, M.-L.; Sayah, R.; Veyre, L.; Nikitine, C.; de Bellefon, C.; Marrot, S.; Meille, V.; Thieuleux, C., Platinum nanoparticles in suspension are as efficient as Karstedt's complex for alkene hydrosilylation. Chem. Commun. 2015, 51, 16194-16196.

Chauhan, B. P.; Rathore, J. S., Regioselective Synthesis of Multifunctional Hybrid Polysiloxanes Achieved by Pt—Nanocluster Catalysis. J. Am. Chem. Soc. 2005, 127, 5790-5791.

Bai, Y.; Zhang, S.; Deng, Y.; Peng, J.; Li, J.; Hu, Y.; Li, X.; Lai, G., Use of functionalized PEG with 4-aminobenzoic acid stabilized platinum nanoparticles as an efficient catalyst for the hydrosilylation of alkenes. J. Colloid Interface Sci. 2013, 394, 428-433.

Stein, J.; Lewis, L.; Gao, Y.; Scott, R., In situ determination of the active catalyst in hydrosilylation reactions using highly reactive Pt (0) catalyst precursors. J. Am. Chem. Soc. 1999, 121, 3693-3703.

Meister, T. K.; Riener, K.; Gigler, P.; Stohrer, J. r.; Herrmann, W. A.; Kühn, F. E., Platinum Catalysis Revisited—Unraveling Principles of Catalytic Olefin Hydrosilylation. ACS Catal. 2016, 6, 1274-1284.

Markó, I. E.; Stérin, S.; Buisine, O.; Mignani, G.; Branlard, P.; Tinant, B.; Declercq, J.-P., Selective and efficient platinum (0)-carbene complexes as hydrosilylation catalysts. Science 2002, 298, 204-206.

Markó, I. E.; Sterin, S.; Buisine, O.; Berthon, G.; Michaud, G.; Tinant, B.; Declercq, J. P., Highly Active and Selective Platinum(0)-Carbene Complexes. Efficient, Catalytic Hydrosilylation of Functionalised Olefins. Adv. Synth. Catal. 2004, 346, 1429-1434.

Bernhammer, J. C.; Huynh, H. V., Platinum (II) complexes with thioether-functionalized benzimidazolin-2-ylidene ligands: Synthesis, structural characterization, and application in hydroelementation reactions. Organometallics 2013, 33, 172-180.

Dunsford, J. J.; Cavell, K. J.; Kariuki, B., Expanded ring N-heterocyclic carbene complexes of zero valent platinum dvtms (divinyltetramethyldisiloxane): Highly efficient hydrosilylation catalysts. J. Organomet. Chem. 2011, 696, 188-194.

Taige, M. A.; Ahrens, S.; Strassner, T., Platinum (II)-bis-(N-heterocyclic carbene) complexes: synthesis, structure and catalytic activity in the hydrosilylation of alkenes. J. Organomet. Chem. 2011, 696, 2918-2927.

Marciniec, B.; Posala, K.; Kownacki, I.; Kubicki, M.; Taylor, R., New Bis (dialkynyldisiloxane) triplatinum (0) cluster: synthesis, structure, and catalytic activity in olefin-hydrosilylation reactions. ChemCatChem 2012, 4, 1935-1937.

Downing, C. M.; Kung, H. H., Diethyl sulfide stabilization of platinum-complex catalysts for hydrosilylation of olefins. Catal. Commun. 2011, 12, 1166-1169.

(56) References Cited

PUBLICATIONS

Sabourault, N.; Mignani, G.; Wagner, A.; Mioskowski, C., Platinum oxide (PtO2): a potent hydrosilylation catalyst. Org. Lett. 2002, 4, 2117-2119.

Chen, Y. J.; Ji, S. F.; Sun, W. M.; Chen, W. X.; Dong, J. C.; Wen, J. F.; Zhang, J.; Li, Z; Zheng, L. R.; Chen, C.; Peng, Q.; Wang, D. S.; Li, Y. D., Discovering Partially Charged Single-Atom Pt for Enhanced Anti-Markovnikov Alkene Hydrosilylation. J. Am. Chem. Soc. 2018, 140, 7407-7410.

Zhu, Y.; Cao, T.; Cao, C.; Luo, J.; Chen, W.; Zheng, L.; Dong, J.; Zhang, J.; Han, Y.; Li, Z.; Chen, C.; Peng, Q.; Wang, D.; Li, Y., One-Pot Pyrolysis to N-Doped Graphene with High-Density Pt Single Atomic Sites as Heterogeneous Catalyst for Alkene Hydrosilylation. ACS Catal. 2018, 8, 10004-10011.

Chen, L.; Sterbinsky, G. E.; Tait, S. L., Synthesis of platinum single-site centers through metal-ligand self-assembly on powdered metal oxide supports. J. Catal. 2018, 365, 303-312.

Chen, L.; Ali, I. S.; Sterbinsky, G. E.; Gamier, J. T. L.; Skrabalak, S. E.; Tait, S. L., Alkene Hydrosilylation on Oxide-Supported Pt-Ligand Single-Site Catalysts. ChemCatChem 2019, 11, 2843-2854.

Huang, Z.; Gu, X.; Cao, Q.; Hu, P.; Hao, J.; Li, J.; Tang, X., Catalytically Active Single-Atom Sites Fabricated from Silver Particles. Angew. Chem. 2012, 124, 4274-4279.

Fako, E.; Lodziana, Z.; Lopez, N., Comparative single atom heterogeneous catalysts (SAHCs) on different platforms: a theoretical approach. Catal. Sci. Technol. 2017, 7, 4285-4293.

Chen, Y. X.; Huang, Z. W.; Ma, Z.; Chen, J. M.; Tang, X. F., Fabrication, characterization, and stability of supported single-atom catalysts. Catal. Sci. Technol. 2017, 7, 4250-4258.

Vilé, G.; Albani, D.; Nachtegaal, M.; Chen, Z.; Dontsova, D.; Antonietti, M.; López, N.; Pérez-Ramírez, J., A Stable Single-Site Palladium Catalyst for Hydrogenations. Angew. Chem. Int. Ed. 2015, 54, 11265-11269.

Xu, W.; Yu, B.; Zhang, Y.; Chen, X.; Zhang, G.; Gao, Z., Single-site SBA-15 supported zirconium catalysts. Synthesis, characterization and toward cyanosilylation reaction. Appl. Surf. Sci. 2015, 325, 227-234.

Ji, P.; Manna, K.; Lin, Z.; Urban, A.; Greene, F. X.; Lan, G.; Lin, W., Single-Site Cobalt Catalysts at New Zr8 (µ2-O)8 (µ2-OH)4 Metal-Organic Framework Nodes for Highly Active Hydrogenation of Alkenes, Imines, Carbonyls, and Heterocycles. J. Am. Chem. Soc. 2016, 138, 12234-12242.

Schweitzer, N. M.; Hu, B.; Das, U.; Kim, H.; Greeley, J.; Curtiss, L. A.; Stair, P. C.; Miller, J. T.; Hock, A. S., Propylene Hydrogenation and Propane Dehydrogenation by a Single-Site Zn2+ on Silica Catalyst. ACS Catal. 2014, 4, 1091-1098.

Sohn, H.; Camacho-Bunquin, J.; Langeslay, R.; Ignacio-de Leon, P.; Niklas, J.; Poluektov, O.; Liu, C.; Connell, J.; Yang, D.; Kropf, J., Isolated, well-defined organovanadium (III) on silica: single-site catalyst for hydrogenation of alkenes and alkynes. Chem. Commun. 2017.

Skomski, D.; Tempas, C. D.; Cook, B. J.; Polezhaev, A. V.; Smith, K. A.; Caulton, K. G.; Tait, S. L., Two- and Three-Electron Oxidation of Single-Site Vanadium Centers at Surfaces by Ligand Design. J. Am. Chem. Soc. 2015, 137, 7898-7902.

Skomski, D.; Tempas, C. D.; Bukowski, G. S.; Smith, K. A.; Tait, S. L., Redox-active on-surface polymerization of single-site divalent cations from pure metals by a ketone-functionalized phenanthroline. J. Chem. Phys. 2015, 142, 101913.

Skomski, D.; Tempas, C. D.; Smith, K. A.; Tait, S. L., Redox-Active On-Surface Assembly of Metal-Organic Chains with Single-Site Pt(II). J. Am. Chem. Soc. 2014, 136, 9862-9865.

Tempas, C. D.; Skomski, D.; Cook, B. J.; Le, D.; Smith, K. A.; Rahman, T. S.; Caulton, K. G.; Tait, S. L., Redox Isomeric Surface Structures Are Preferred over Odd-Electron Pt1+. Chem. Eur. J. 2018, 24, 15852-15858.

Williams, C. G.; Wang, M.; Skomski, D.; Tempas, C. D.; Kesmodel, L. L.; Tait, S. L., Metal-Ligand Complexation through Redox Assembly at Surfaces Characterized by Vibrational Spectroscopy. J. Phys. Chem. C 2017.

Morris, T. W.; Huerfano, I. J.; Wang, M.; Wisman, D. L.; Cabelof, A. C.; Din, N. U.; Tempas, C. D.; Le, D.; Polezhaev, A. V.; Rahman, T. S.; Caulton, K. G.; Tait, S. L., Multi-electron Reduction Capacity and Multiple Binding Pockets in Metal-Organic Redox Assembly at Surfaces. Chem. Eur. J. 2019, 25, 5565-5573.

Kaim, W.; Fees, J., The new tetrafunctional pi-acceptor ligand 3,6-bis(2'-pyrimidyl)-1,2,4,5-tetrazine (BMTZ)-diruthenium complexes of BMTZ and of its 1,4-dihydro form. Z. Naturforsch., B: Chem. Sci. 1995, 50, 123-127.

PDO OR BMTZ LIGAND FOR SUPPORTED COORDINATED PT HYDROSILYLATION CATALYSTS

CROSS REFERENCE TO RELATED APPLICATIONS

This application claims priority under 35 U.S.C. § 119(e) to U.S. Provisional Patent Application Ser. No. 62/896,350, filed Sep. 5, 2019, which is expressly incorporated by reference herein.

STATEMENT OF GOVERNMENT RIGHTS

This invention was made with government support under US Department of Energy, Office of Basic Energy Sciences, Chemical Sciences program, Grant DE-SC0016367. The government has certain rights in the invention.

FIELD OF THE INVENTION

The invention relates generally to single-site metal catalysts such as Pt single-site centers on powdered oxide supports with 1,10-phenanthroline-5,6-dione (PDO) or bis-pyrimidyltetrazine (BMTZ) on powdered MgO, $Al_2O_3$, or $CeO_2$.

BACKGROUND OF THE INVENTION

Hydrosilylation, the addition of a Si—H bond to a multiple bond (particularly C=C), has been of significant importance in silicon chemistry since its first report in 1947.[1] It serves as a versatile tool to produce various functionalized silicon-based polymers,[2-10] which have observed wide applications as lubricant oils,[11] coating,[12-14] preceramic,[15-16] adhesive,[17-18] and sealing materials.[19-21] Besides polymer production, hydrosilylation also offers solutions to silicone curing[12, 21] and Si—C bond building in fine chemical synthesis.[22-25] Industrial hydrosilylation catalysts have long been dominated by homogeneous Pt complexes due to their superior activity over other metals.[26-34] Speier catalyst, $H_2PtCl_6/(Pr—OH)$,[35] prevailed for decades before being replaced by the more active and selective Karstedt catalyst, a vinyl-siloxane $Pt^0$ complex developed in 1970s.[36] One significant drawback of Karstedt catalyst is the formation of colloidal Pt, which deactivates the catalyst and reduces product quality.[12, 37-41] The problem is further underscored by the high cost, volatile market and uncertain future supply of Pt. Besides the Pt aggregation problem, C=C isomerization and hydrogenation are difficult to avoid, and some important functional groups, such as epoxy,[42-43] are unstable under reaction conditions. Consequently, research effort continues to develop Pt hydrosilylation catalysts with improved selectivity and stability. Examples of recent progress include Pt-carbene complexes,[42-46] tri-nuclear alkyne $Pt^0$ complexes,[47] and anti-sulfur-poisoning Pt catalysts.[48] Heterogeneous Pt catalysts, such as Pt nanoparticles,[37-39] $PtO_2$,[49] and supported Pt single-sites,[50-51] have also inspired interests because they can be easily separated and recycled when reactants are soluble.

Previously, a series of heterogeneous Pt single-site catalysts (SSCs) for hydrosilylation were developed.[52-53] Growing interest in SSCs in the past few decades root from their potentials to combine the easy recovery of heterogeneous catalysts with the high metal utilization efficiency and selectivity of homogeneous ones.[54-61] Some Pt hydrosilylation SSCs were created by a metal-ligand self-assembly strategy inspired by UHV studies.[52, 62-67] Thorough characterizations revealed that the SSCs principally contain atomically dispersed $Pt^{2+}$ on various high-surface-area oxide supports, with Pt single-sites stabilized by the bidentate N binding pockets and oxidizing potential from the 3,6-di-2-pyridyl-1,2,4,5-tetrazine (DPTZ) ligand.[52] The Pt-DPTZ SSCs exhibit much higher hydrosilylation activity than both supported Pt aggregates and other Pt SSCs in the literature.[50-51, 53] More importantly, compared with Karstedt catalyst, they improve selectivity, reduce Pt aggregation, and suppress the decomposition of epoxy groups. Detailed studies revealed that supported $Pt^{2+}$ single-sites are main active sites, which are activated by the leaving of Cl and reversible detachment of the support O and/or DPTZ.[53] Nonetheless, the main challenge faced by Pt-DPTZ SSCs is that active Pt sites are partially leached into the solution during catalysis, which limits their reusability and hence application prospect.

Therefore, to enhance the application potential of these systems, a new method that can create similar metal-ligand single-sites on high surface area catalyst supports under ambient pressure is required.

BRIEF SUMMARY OF THE INVENTION

Developing single-site metal catalysts has been regarded as a promising strategy to improve activity and selectivity in heterogeneous catalysis. In one embodiment, a metal-ligand self-assembly method to create Pt single-site centers on powdered oxide supports is provided. Impregnating Pt and a ligand 1,10-phenanthroline-5,6-dione (PDO) or bis-pyrimidyltetrazine (BMTZ) simultaneously (one-step) creates Pt-PDO or Pt-BMTZ single-sites on powdered MgO, $Al_2O_3$, and $CeO_2$. MgO have the most uniform single-sites due to a strong, non-competitive support-ligand interaction, and a support-metal interaction of appropriate strength.

Pt(II) centers are stabilized between the N binding pockets of PDO or BMTZ, with minimal metallic nanoparticle formation. The systems were characterized by XPS. These oxide-supported Pt-PDO and/or Pt-BMTZ single-sites were found to be effective catalysts in hydrosilylation reactions. The embodiments described herein demonstrate a metal-ligand self-assembly strategy to create metal single-site centers on high surface area catalyst supports.

It was found that the PDO ligand significantly alleviates active site leaching, creating a catalyst with excellent reusability through multiple reaction cycles. Post-reaction characterizations shed light onto the nature of active sites on these two catalysts.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention.

Accordingly, the detailed descriptions are to be regarded as illustrative in nature and not restrictive.

DETAILED DESCRIPTION

Figure 1:
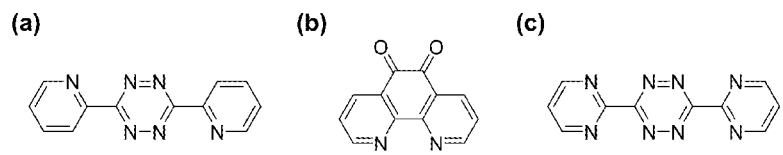
FIG. 1 depicts structures of ligands: (a) 3,6-(2-pyridyl)-1,2,4,5-tetrazine (DPTZ), (b) 1,10-phenanthroline-5,6-dione (PDO), and (c) bis-pyrimidyltetrazine (BMTZ).

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

The term halide is known in the art and is intended to encompass chloride (Cl⁻), iodide (I⁻), fluoride (F⁻) and bromide (B⁻).

In chemical formulae presented herein, it should be understood that the use of solid line or a dashed line between a heteroatom, e.g., N or O, and a platinum center indicates that there is a physical association between the heteroatom and the metal, typically considered a coordinative or dative bond. It does not necessarily imply that a covalent bond is present.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

Two new supported Pt hydrosilylation catalysts with a bidentate N-based ligands 1,10-Phenanthroline-5,6-Dione (PDO) and bis-pyrimidyltetrazine (BMTZ) are disclosed. The Pt-PDO/$CeO_2$ and Pt-BMTZ/$CeO_2$ catalysts are created through a metal-ligand self-assembly strategy, and principally contain highly dispersed $Pt^{2+}$ sites. Both catalysts are active for alkene hydrosilylation under mild conditions with high selectivity, while Pt-PDO/$CeO_2$ shows improved selectivity with an epoxy-containing substrate compared to Karstedt catalyst. The Pt-PDO/$CeO_2$ catalyst also exhibits excellent reusability: the activity is steady through four reaction cycles and Pt leaching is significantly mitigated compared to Pt-DPTZ/$CeO_2$. After reactions, Pt maintains similar coordination level with PDO, and is thus highly dispersed without noticeable aggregation. Cl partially leaves Pt, likely responsible for catalyst activation. A $Pt^{(2+\delta)+}$ species converted from $Pt^{2+}$ is proposed to be the active species.

The supported DPTZ ligand acts as a catalyst for hydrosilylation reactions. A catalyst is essential for this reaction. Current industrial production of silane materials relies on the Karstedt catalyst and the present invention shows some improvement over that catalyst with the new material described herein. Silane and silicon compounds are employed to enhance adhesion, increase mechanical properties of composites, improve dispersion of pigments and minerals, provide crosslinking, immobilize catalysts, and bind biomaterials.

Catalysts are characterized by activity and selectivity. Activity refers to how much of the starting material in converted into a product material. Selectivity refers to the idea that a reaction might produce multiple products, but that it is usually desirable to obtain only one of those. The new catalyst material described herein outperforms the Karstedt catalyst in both activity and selectivity, thus there would be an improvement to the chemical production of silanes using this new material.

It should be understood that the catalyst compounds are reaction products of a platinum precursor and an organic ligand, such as 1,10-Phenanthroline-5,6-Dione (PDO) or bis-pyrimidyltetrazine (BMTZ). Therefore, the resulting catalyst precursor can be a mixture of one or more active species. For example, the reaction between a platinum precursor and PDO can provide at least the following catalyst precursors and should not be limiting to one or more of the formulae:

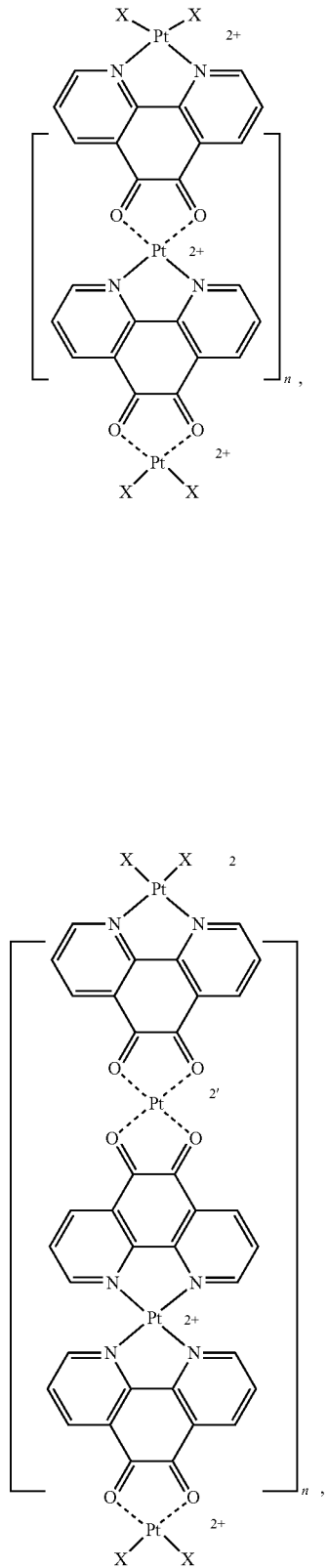

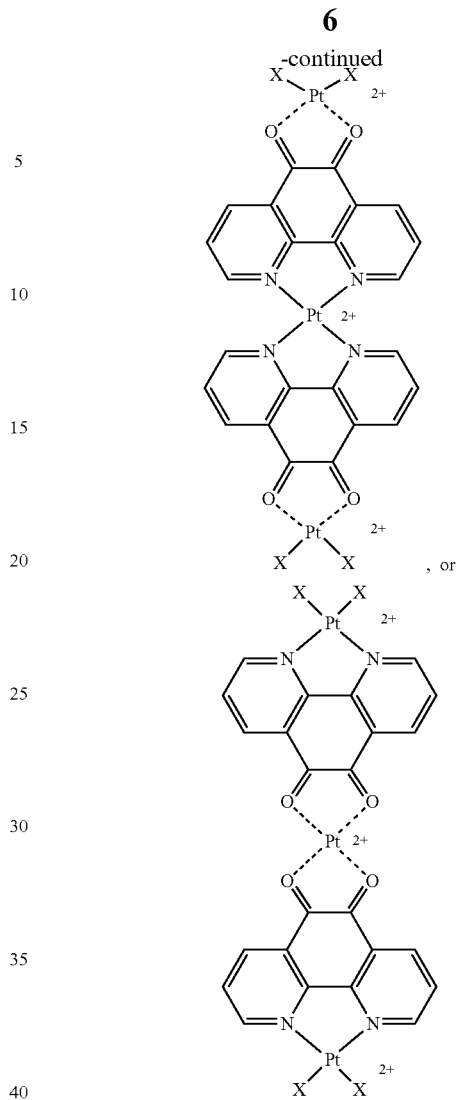

wherein each X, independently, is a halide; and
wherein n is 1-5 when present, e.g., 1, 2, 3, 4 or 5.

Oxide-supported Pt-DPTZ single-site catalysts (SSCs) are known.[52-53] These heterogeneous SSCs exhibit improvements over the commercial hydrosilylation catalyst (Karstedt catalyst) in selectivity, stability, and substrate scope. Nevertheless, their applications are challenged by low reusability due to active site leaching. Pt-DPTZ coordination through the bidentate N binding pockets (FIG. 1) is stable, but the binding between Pt-DPTZ complexes and supports is not.[53] Consequently, DPTZ has been replaced with other bidentate N-based ligands: 1,10-phenanthroline-5,6-dione (PDO, FIG. 1), and bis-pyrimidyltetrazine (BMTZ, FIG. 1). Both ligands have more functional groups offering stronger interaction with oxides than DPTZ. Not to be limited by theory, it is hypothesized that the replacement enhances interactions between Pt-ligand complexes and supports, so that active sites can be more effectively recycled.

The Pt-PDO/$CeO_2$ catalyst was synthesized using the one-step impregnation method reported previously,[52] as described above. In short, $H_2PtCl_6 \cdot 6H_2O$ solution was added dropwise to pre-mixed PDO solution (water as solvent) and $CeO_2$, followed by stirring, water evaporation, and rinsing (see the experimental section for details). $CeO_2$ was selected as the support because in previous studies, it created catalysts with higher activity and reusability than other oxides.[52-53] 1 wt % Pt was added, and the actual Pt loading was determined by inductively coupled plasma mass spectrometry (ICP-MS) to be 0.47% (Table 1). On fresh Pt-PDO/$CeO_2$, the Pt $4f_{7/2}$ X-ray photoelectron spectroscopy (XPS) peak is consistent with a single narrow $Pt^{2+}$ component (binding energy=72.8 eV, full width at half maximum (FWHM)≈2.1 eV, FIG. 2 top). Therefore, Pt exists principally as dispersed $Pt^{2+}$ cations, while metallic Pt nanoparticles are not present. This is expected because both bidentate N pockets and di-ketone pockets on PDO are suitable for Pt coordination, and the ligand has oxidizing potentials, stabilizing dispersed $Pt^{2+}$. Previous evidence supported that a similar method creates predominantly Pt-DPTZ single-sites on $CeO_2$.[52-53] On fresh Pt-PDO/$CeO_2$, N (from PDO) and Cl (from $H_2PtCl_6 \cdot 6H_2O$) are clearly identified by XPS. N:Pt and Cl:Pt ratios are calculated based on XPS peak areas, and presented in Table 2. The sum of the two ratios on fresh Pt-PDO/$CeO_2$ is 3.4, indicating Pt are highly coordinated with N, Cl. Considering Pt also coordinates with O from PDO and $CeO_2$, Pt aggregates are not likely formed.

Figure 3:
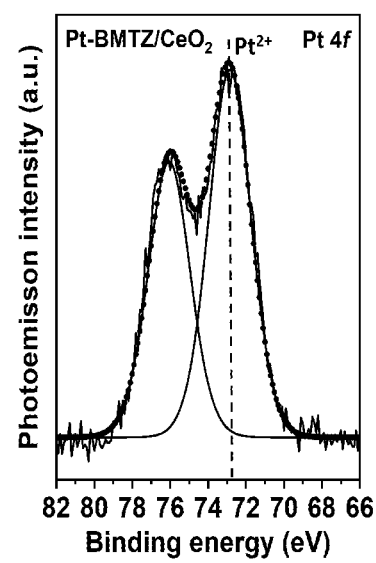
FIG. 3 depicts fittings of Pt 4f XP spectra of fresh Pt-BMTZ/$CeO_2$.
Figure 4:
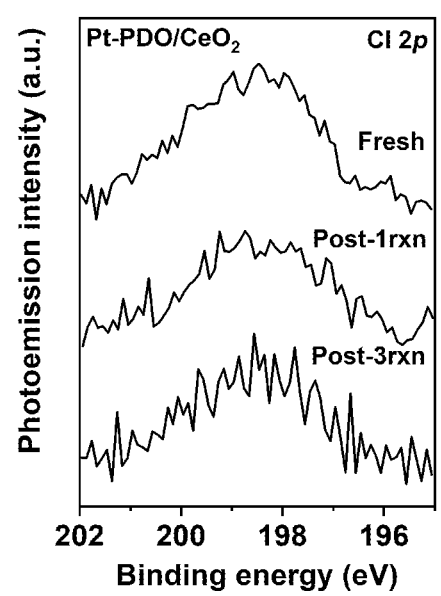
FIG. 4 is an XP spectra of Pt-PDO/$CeO_2$, Cl 2p region. Fresh catalyst (top), after 1 cycle of the reaction (mid), and after 3 cycles of the reaction (bottom). All spectra are normalized based on Pt 4f peak area so that peak size reflects the relative concentration of Cl with Pt (Cl:Pt ratio) on the catalyst.
Figure 5:
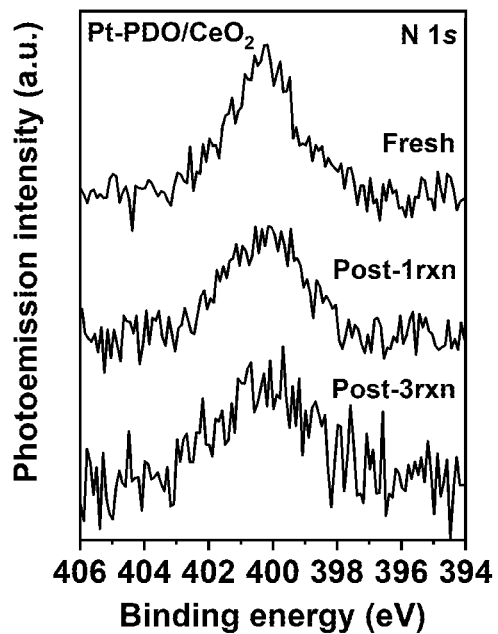
FIG. 5 is N 1s region. Fresh catalyst (top), after 1 cycle of the reaction (mid), and after 3 cycles of the reaction (bottom). All spectra are normalized based on Pt 4f peak area so that peak size reflects the relative concentration of N with Pt (N:Pt ratio) on the catalyst.
Figure 6:
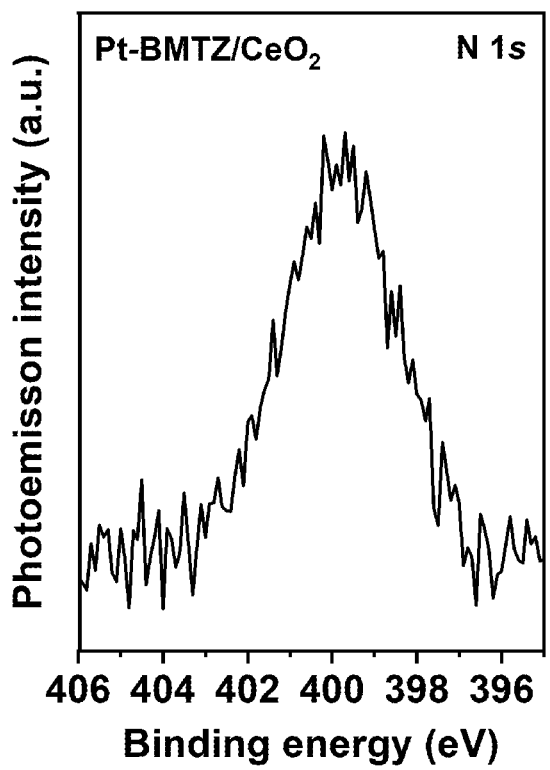
FIG. 6 is an XP spectra of fresh Pt-BMTZ/$CeO_2$, N is region.
Figure 7:
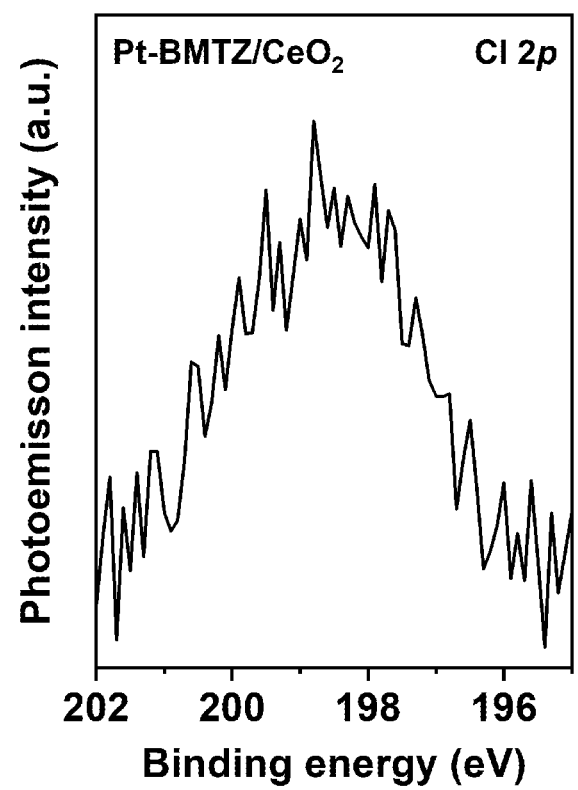
FIG. 7 is an XP spectra of fresh Pt-BMTZ/$CeO_2$, Cl 2p region.

The Pt-BMTZ/$CeO_2$ catalyst was synthesized with a similar procedure with Pt-PDO/$CeO_2$ (acetone as solvent). The final Pt wt % of the catalyst is 0.33% (Table 1). The Pt $4f_7$12 XPS peak also shows a single $Pt^{2+}$ component (binding energy=72.8 eV, FWHM≈2.6 eV, FIG. 3, suggesting most Pt are dispersed $Pt^{2+}$ cations instead of metallic particles. Again, this is due to the favored coordination between bidentate N pockets and Pt, as well as the oxidizing potential of BMTZ. N (from the BMTZ) and Cl (from $H_2PtCl_6 \cdot 6H_2O$) are also clearly identified by XPS (FIG. 9), with the sum of N:Pt and Cl:Pt ratios being 6.6 (Table 2). In summary, XPS indicates that on both Pt-PDO/$CeO_2$ and Pt-BMTZ/$CeO_2$, Pt bind with the ligand, Cl, and O from $CeO_2$, forming highly dispersed $Pt^{2+}$ sites.

TABLE 1

Pt:Ce ratios from XPS and Pt wt % from ICP, before and after reaction cycles.

| | Pt-PDO/$CeO_2$ | | | |
| --- | --- | --- | --- | --- |
| | Fresh | After 1 reaction cycle | After 3 reaction cycles | Pt-BMTZ/$CeO_2$ Fresh |
| XPS Pt:Ce | 0.101 | 0.098 | 0.070 | 0.048 |
| XPS Pt recovery (%) | 100 | 97 | 69 | — |
| ICP Pt wt % | 0.47 | — | 0.29 | 0.33 |
| ICP Pt recovery (%) | 100 | — | 62 | — |

TABLE 2

Summary of XPS results, before and after hydrosilylation reaction. Binding energy, full width of half maximum (FWHM), and atomic ratios.

| | Pt-PDO/$CeO_2$ | | | |
| --- | --- | --- | --- | --- |
| | Fresh | After 1 reaction cycle | After 3 reaction cycles | Pt-BMTZ/$CeO_2$ Fresh |
| Pt $4f_{7/2}$ binding energy (eV) | 72.8 | 72.7 | 72.9 | 72.8 |
| Pt 4f FWHM (eV) | 2.1 | 2.8 | 3.3 | 2.6 |
| N:Pt | 2.1 | 2.0 | 2.2 | 5.3 |
| Cl:Pt | 1.3 | 0.9 | 1.0 | 1.3 |

Figure 8:
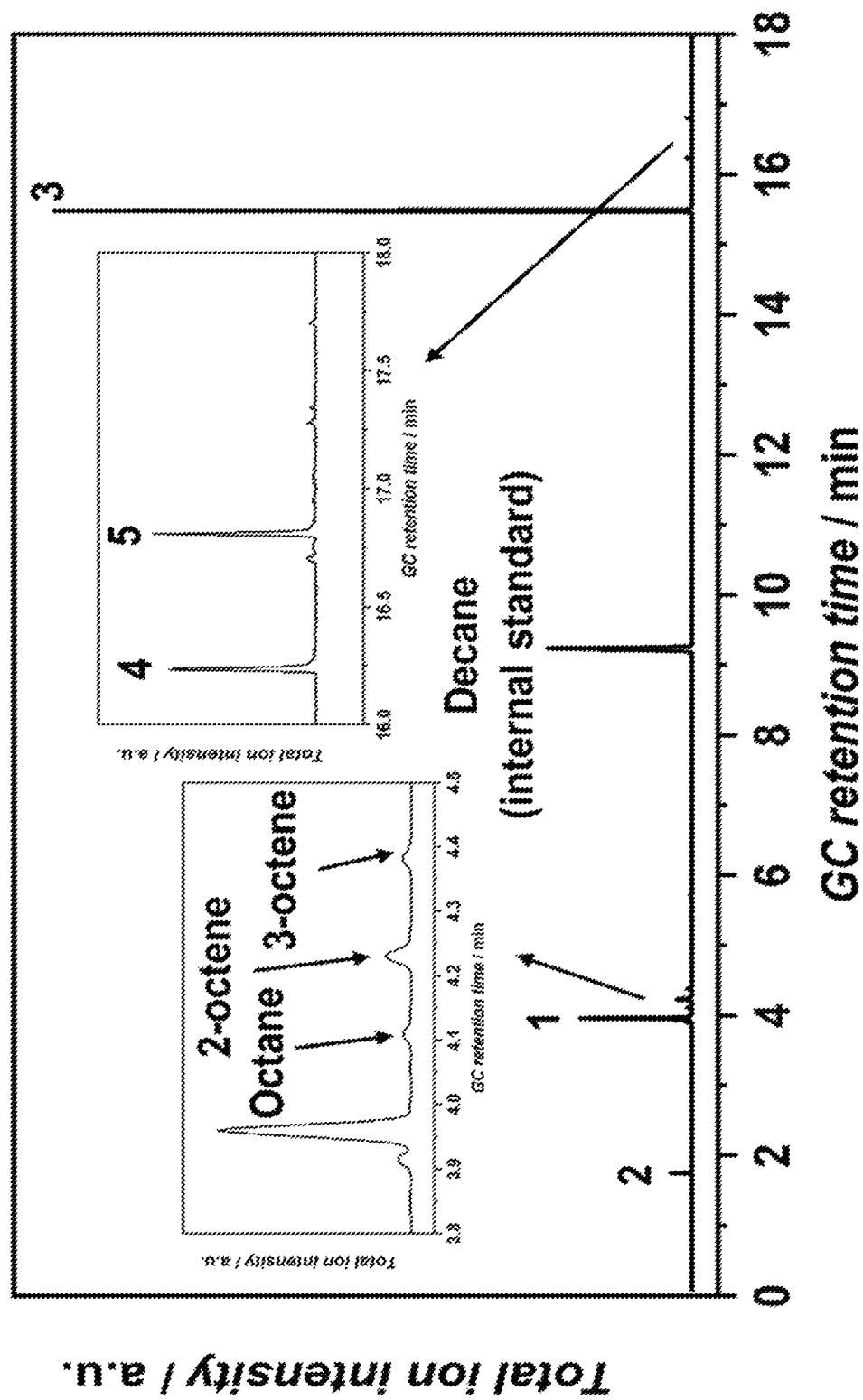
FIG. 8 is a GC-MS spectrum from a post-reaction solution between 1 and 2, showing the formation of the desired product 3 and by-products. Numbers in the figure refer to compound numbers in Scheme 1. The concentration of main Si-containing by-products 4 and 5 is extremely low compared with the desired product 3, and no Markovnikov addition product was observed, showing high selectivity of the catalyst.

Pt-PDO/$CeO_2$ and Pt-BMTZ/$CeO_2$ were tested as catalysts for a model hydrosilylation reaction between 1-octene (1) and dimethoxymethylsilane (2) shown in Scheme 1. Two reaction conditions were used: 70° C. for 30 min, and 60° C. for 20 min. The former was used to evaluate active site recyclability. The latter was for turnover number (TON) calculations and activity comparison as it keeps the conversion of 2 far below 100%. Both catalysts exhibited catalytic activity under both conditions, yielding anti-Markovnikov addition product 3 (see FIG. 8 for a representative GC-MS spectrum of the post-reactions solution). FIG. 8 also shows that alkene isomerization (forming 2-octene and 3-octene) and hydrogenation (forming octane) occurred. Therefore, all reactions were performed with 1.2 eq. 1. The most concentrated by-products from 2 were silane oligomers 4 and 5, the concentration of which was very low compared with 3 (FIG. 8). In addition, no Markovnikov addition product was observed, suggesting the catalysts are highly selective in this reaction. For the hydrosilylation of epoxy-containing alkene (Scheme 2), Pt-PDO/$CeO_2$ showed improved selectivity (66%) over Karstedt catalyst (~50%) at 100% silane conversion (80° C., 100 min),[42, 53] which was similar with Pt-DPTZ/$CeO_2$ (71%).[53]

Scheme 1. Hydrosilylation reaction between 1-octene (1) and dimethoxymethylsilane (2) used to test supported coordinated Pt catalysts for the production of desired product (3). Also shown are two Si-containing by-products, (4) and (5).

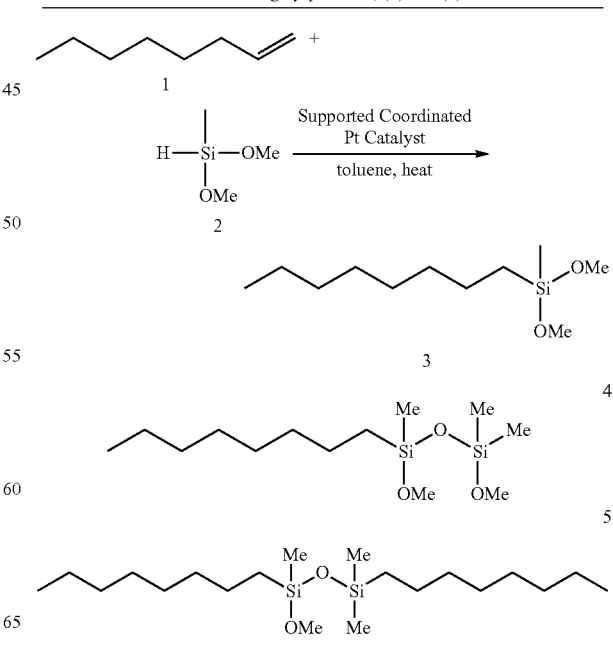

Scheme 2. Hydrosilylation reaction between 4-vinyl-1-cyclohexane 1,2-epoxide and trimethoxysilane.

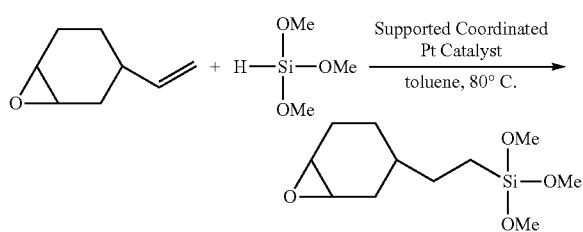

Figure 9:
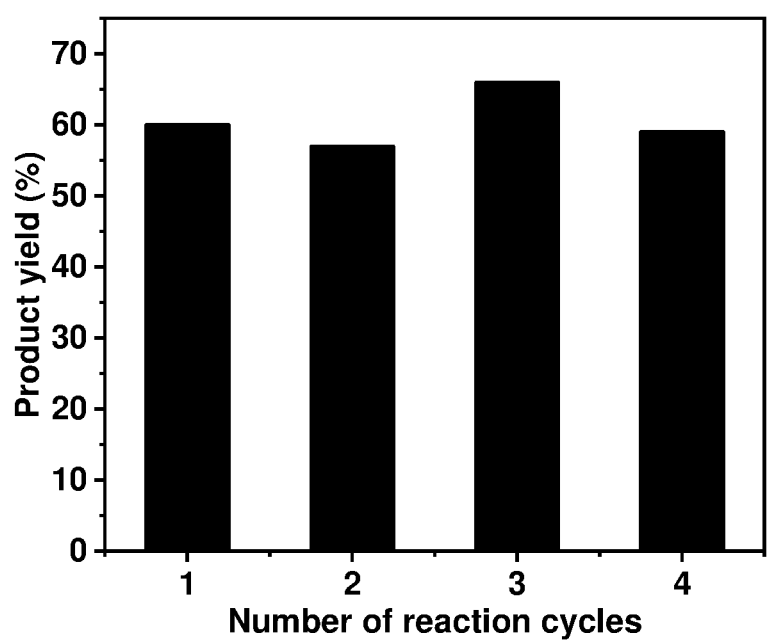
FIG. 9 shows reusability test results of Pt-PDO/$CeO_2$ for four hydrosilylation reaction cycles. Reaction conditions: T=70° C., t=30 min, 30 mg catalyst, 6 mmol 1, 5 mmol 2, and 3 mL toluene.

The reusability of Pt-PDO/CeO$_2$ was examined by recycling it for 4 cycles of the reaction shown in Scheme 1, and results are shown in FIG. 9. After each reaction cycle, the catalyst was separated and put into a fresh batch of reaction solution for the next cycle. The conversion of 2 in all cycles was below 100%, and the selectivity remained similar with the first cycle. Pt-PDO/CeO$_2$ showed excellent reusability, as its activity did not drop through 4 cycles (~60% yield). In comparison, it has been shown that product yield decreases quickly on Pt-DPTZ/CeO$_2$ once the conversion of 2 drops below 100%, due to active site leaching.[53] FIG. 9 strongly indicates that almost all active sites on Pt-PDO/CeO$_2$ can be recycled effectively, which is an improvement over Pt-DPTZ/CeO$_2$. Pt recovery percentage after the first reaction cycle was also much higher on Pt-PDO/CeO$_2$ (97% XPS-based in Table 1) than Pt-DPTZ/CeO$_2$ (62% XPS-based from previous studies). Activity of fresh Pt-PDO/CeO$_2$ and Pt-BMTZ/CeO$_2$ at 70° C., TON at 60° C. in the first 20 min, are presented and compared with Pt-DPTZ/CeO$_2$ in Table 3. It was recognized that neither Pt-PDO/CeO$_2$ nor Pt-BMTZ/CeO$_2$ was not as active as Pt-DPTZ/CeO$_2$, but for the case of Pt-PDO/CeO$_2$, the TON difference is within 3-fold. In practice, one can compensate for lower activity by using more catalysts, but active site leaching is more challenging, especially for expensive noble metals. Therefore, from a practical perspective, significantly enhanced reusability is more desirable.

TABLE 3

Activity of Pt-PDO/CeO$_2$ and Pt-BMTZ/CeO$_2$ compared with Pt-DPTZ/CeO$_2$

| Metal-Ligand Catalyst | Yield[a] (%) 70° C., 30 min | TON per Pt[b] 60° C., 20 min |
|---|---|---|
| Pt-DPTZ | 90[c] | 6200 |
| Pt-PDO | 66 | 2700 |
| Pt-BMTZ | 24 | 1600 |

[a]Reaction condition: T = 70° C., t = 30 min, 30 mg catalyst, 6 mmol 1, 5 mmol 2, and 3 mL toluene.
[b]Reaction condition: T = 60° C., t = 20 min, 15 mg catalyst, 3 mmol 1, 2.5 mmol 2, and 1.5 mL toluene.
[c]Complete conversion of 2 was achieved in this reaction.

Figure 2:
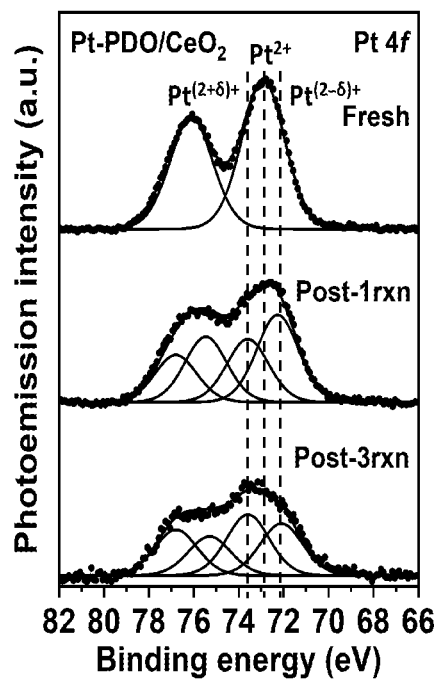
FIG. 2 depicts fittings of Pt 4f XP spectra of Pt-PDO/$CeO_2$: fresh catalyst (top), after 1 cycle of the reaction (mid), and after 3 cycles of the reaction (bottom). All spectra are normalized based on Ce 3d peak area so that the peak area reflects Pt concentration (Pt:Ce ratio) on the catalyst.

The highly reusable Pt-PDO/CeO$_2$ was characterized by XPS after the reaction in Scheme 1 to investigate its active sites. It was found that most, but not all, Pt was recyclable, with 97% Pt recovered after 1 cycle and 60-70% Pt recovered after 3 cycles (Table 1). ICP on post-reaction solution from the first reaction cycle showed Pt equivalent with <2% total Pt leaching, consistent with XPS results in Table 1. After the first reaction cycle, Table 2 shows that Pt 4f XPS peak widens (FWHM increased from 2.1 to 2.8) without significant shift in binding energy, indicating broader oxidation state distribution centered around +2 (FIG. 2, mid). Fitting (FIG. 2, Table 4) suggests two components were formed: Pt$^{(2-\delta)+}$ (~72.2 eV) and Pt$^{(2+\delta)+}$ (~73.7 eV). This implies that at least two different Pt species exist on fresh Pt-PDO/CeO$_2$. Although both appear to be Pt$^{2+}$, they evolve differently during catalysis, and hence the oxidation states vary after the reaction. After 3 cycles, the binding energy was still around 72.8 eV, and the peak further widens to FWHM=3.3 (Table 2). FIG. 2 (bottom) and Table 4 exhibit that the Pt$^{(2+\delta)+}$ component did not change much compared with after 1 reaction cycle, while the Pt$^{(2-\delta)+}$ component decreased obviously, indicating the Pt leaching (~30% of total Pt) was mainly from the Pt$^{(2-\delta)+}$ species. However, the partial loss of P$^{t(2-\delta)+}$ had negligible impacts on the activity (FIG. 9), strongly implying that the Pt$^{(2+\delta)+}$ were the dominating active sites. It was demonstrated that although Pt leaching still occurred on Pt-PDO/CeO$_2$, the actual active sites can be successfully recycled. It was noted that no metallic Pt was detected (FIG. 2), implying Pt remains highly dispersed. XPS also revealed that the N:Pt ratio remains constant through 3 cycles (Table 2, FIG. 9), and thus the Pt-PDO coordination is highly stable. In contrast, the Cl:Pt ratio drops (Table 2, FIG. 8), which is associated with the catalyst activation from previous studies on Pt-DPTZ/CeO$_2$.[53]

TABLE 4

Changes in relative Pt concentrations of various oxidation states before and after hydrosilylation reactions on Pt-PDO/CeO$_2$.

| | Relative concentration[a] | | | |
|---|---|---|---|---|
| Catalyst status | Pt$^{(2-\delta)+}$ | Pt$^{2+}$ | Pt$^{(2+\delta)+}$ | Total Pt |
| Fresh | 0 | 1 | 0 | 1 |
| post-1rxn | 0.54 | 0 | 0.43 | 0.97 |
| post-3rxn | 0.31 | 0 | 0.38 | 0.69 |

[a]Relative concentration of a Pt component on a sample was calculated based on the peak area from fittings (normalized to Ce 3d area of the same sample). For each catalyst, the total Pt 4f peak area of its fresh form was defined as 1.

The following paragraphs enumerated consecutively from (1) through (55) provide for various aspects of the present invention. In one embodiment, in a first paragraph (1), the present invention provides a single site catalyst system comprising: (a) a single site catalyst precursor compound and (b) a support, wherein the single site catalyst precursor comprises one or more of the formulae:

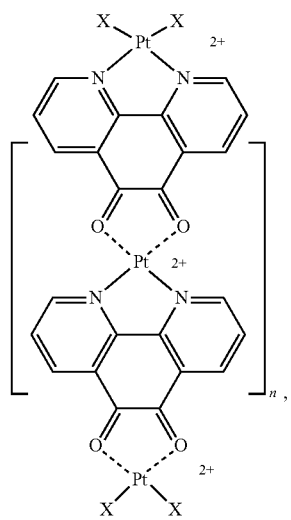

-continued

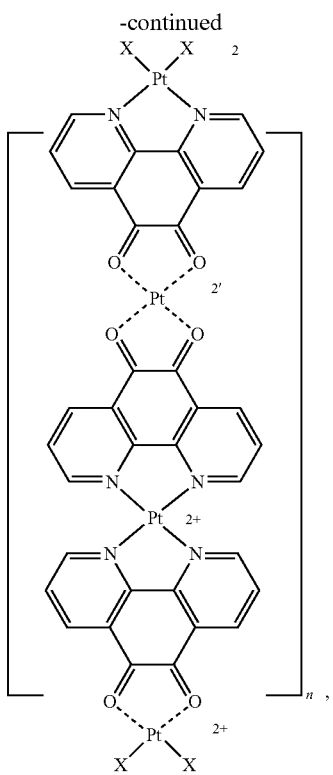

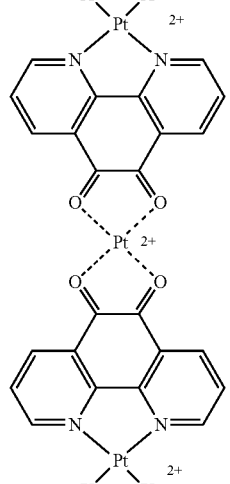

wherein each X, independently, is a halide; and wherein n is 1-5 when present, e.g., 1, 2, 3, 4, or 5.

2. The single site catalyst system of claim 1, wherein the support is selected from the group consisting of powdered MgO, $Al_2O_3$, and $CeO_2$.

3. The single site catalyst system of claim 2, wherein the support is MgO.

4. The single site catalyst system of claim 2, wherein the support is $Al_2O_3$.

5. A process comprising:

(a) contacting a single site catalyst precursor comprising one or more of the formulae:

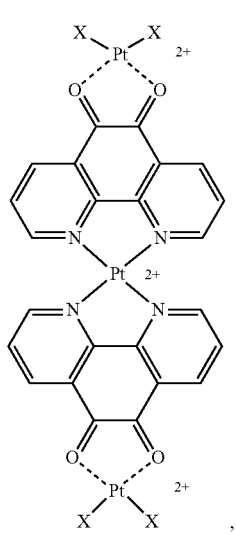, or

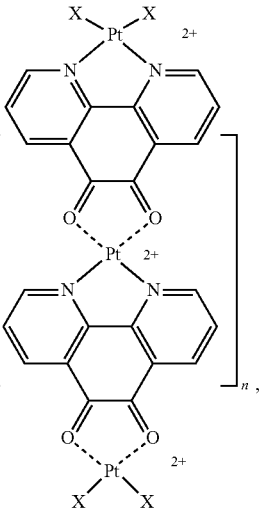

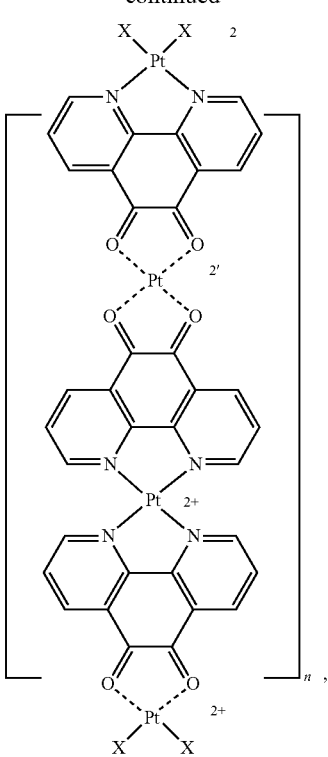

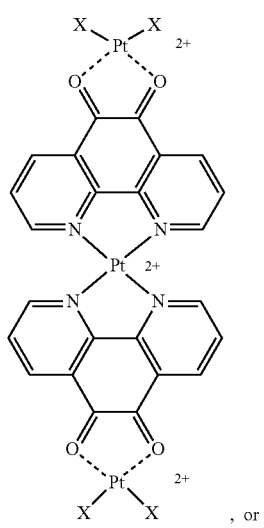, or

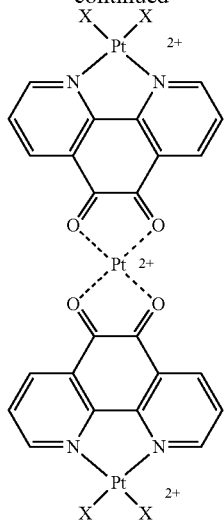

wherein each X, independently, is a halide; and
wherein n is 1-5 when present, e.g., 1, 2, 3, 4 or 5;
(b) contacting the supported catalyst system, a vinyl terminated alkene and a hydrosilylation agent under hydrosilylation conditions; and
(c) hydrosilylating the vinyl terminated alkene to form a hydrosilylated alkyl product.

6. The process of claim 5, wherein the support is selected from the group consisting of powdered MgO, $Al_2O_3$, and $CeO_2$.

7. The process of claim 6, wherein the support is MgO.

8. The process of claim 6, wherein the support is $Al_2O_3$.

9. The process of any of claims 5 through 8, wherein the vinyl terminated alkene is 1-octene 10. The process of any of claims 5 through 9, wherein the hydrosilylation agent comprises dimethoxymethylsilane.

11. A process comprising:
(a) treating 1,10-phenanthroline-5,6-dione (PDO) with a support in a solvent to form a first mixture;
(b) stirring the first mixture at room temperature for a period of time to form a second mixture;
(c) treating the second mixture with $H_2PtCl_6 \cdot 6H_2O$ to form a third mixture; and
(d) drying the third mixture to remove the solvent to provide dried catalyst.

12. The process of claim 11, further comprising the step:
(e) washing the dried catalyst with water;
(f) washing the water washed catalyst of step (e) with dichloromethane (DCM) until all free 1,10-phenanthroline-5,6-dione (PDO) is removed to provide a supported catalyst.

13. The process of claim 11 or 12, wherein the support is selected from the group consisting of powdered MgO, $Al_2O_3$, and $CeO_2$.

14. The process of claim 13, wherein the support is MgO.

15. The process of claim 13, wherein the support is $Al_2O_3$.

16. A process comprising:
(a) contacting the supported catalyst system of any of claims 11 through 15, a vinyl terminated alkene and a hydrosilylation agent under hydrosilylation conditions; and
(b) hydrosilylating the vinyl terminated alkene to form a hydrosilylated alkyl product.

17. The process of claim 16, wherein the vinyl terminated alkene is 1-octene

18. The process of either claim 16 or claim 17, wherein the hydrosilylation agent comprises dimethoxymethylsilane.

19. The single site catalyst system of claim 2, wherein the support is CeO$_2$.

20. The process of claim 6, wherein the support is CeO$_2$.

21. The process of claim 13, wherein the support is CeO$_2$.

22. A single site catalyst system comprising: (a) a single site catalyst precursor compound and (b) a support, wherein the single site catalyst precursor comprises the formula:

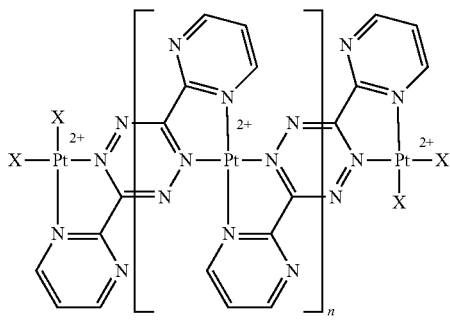

wherein each X, independently, is a halide; and
wherein n is 1 to 5, e.g., 1, 2, 3, 4, or 5.

23. The single site catalyst system of claim 22, wherein the support is selected from the group consisting of powdered MgO, Al$_2$O$_3$, and CeO$_2$.

24. The single site catalyst system of claim 23, wherein the support is MgO.

25. The single site catalyst system of claim 23, wherein the support is Al$_2$O$_3$.

26. A process comprising:
(a) contacting a single site catalyst precursor comprising the formula:

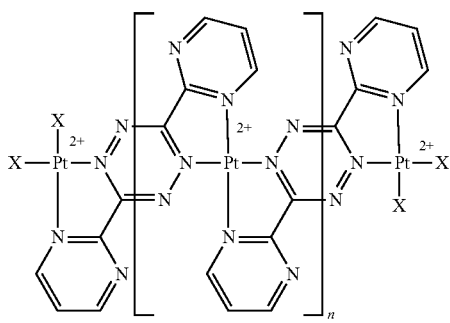

wherein each X, independently, is a halide; and
wherein n is 1 to 5, e.g., 1, 2, 3, 4, or 5;
(b) contacting the supported catalyst system, a vinyl terminated alkene and a hydrosilylation agent under hydrosilylation conditions; and
(c) hydrosilylating the vinyl terminated alkene to form a hydrosilylated alkyl product.

27. The process of claim 26, wherein the support is selected from the group consisting of powdered MgO, Al$_2$O$_3$, and CeO$_2$.

28. The process of claim 27, wherein the support is MgO.

29. The process of claim 27, wherein the support is Al$_2$O$_3$.

30. The process of any of claims 26 through 29, wherein the vinyl terminated alkene is 1-octene.

31. The process of any of claims 26 through 30, wherein the hydrosilylation agent comprises dimethoxymethylsilane.

32. A process comprising:
(a) treating bis-pyrimidyltetrazine (BMTZ) with a support in a solvent to form a first mixture;
(b) stirring the first mixture at room temperature for a period of time to form a second mixture;
(c) treating the second mixture with H$_2$PtCl$_6$.6H$_2$O to form a third mixture; and
(d) drying the third mixture to remove the solvent to provide dried catalyst.

33. The process of claim 32, further comprising the step:
(e) washing the dried catalyst with water;
(f) washing the water washed catalyst of step (e) with dichloromethane (DCM) until all free bis-pyrimidyltetrazine (BMTZ) is removed to provide a supported catalyst.

34. The process of claim 32 or 33, wherein the support is selected from the group consisting of powdered MgO, Al$_2$O$_3$, and CeO$_2$.

35. The process of claim 34, wherein the support is MgO.

36. The process of claim 34, wherein the support is Al$_2$O$_3$.

37. A process comprising:
(a) contacting the supported catalyst system of any of claims 32 through 36, a vinyl terminated alkene and a hydrosilylation agent under hydrosilylation conditions; and
(b) hydrosilylating the vinyl terminated alkene to form a hydrosilylated alkyl product.

38. The process of claim 37, wherein the vinyl terminated alkene is 1-octene

39. The process of either claim 37 or claim 38, wherein the hydrosilylation agent comprises dimethoxymethylsilane.

40. The single site catalyst system of claim 23, wherein the support is CeO$_2$.

41. The process of claim 27, wherein the support is CeO$_2$.

42. The process of claim 35, wherein the support is CeO$_2$.

43. A supported catalyst system comprising the reaction product of a platinum salt, an organic ligand comprising 1,10-phenanthroline-5,6-dione (PDO), wherein the platinum salt and organic ligand form a ligand/platinum catalyst precursor, and a support to provide the supported catalyst.

44. The supported catalyst system of claim 43, wherein the support is selected from the group consisting of powdered MgO, Al$_2$O$_3$, and CeO$_2$.

45. The supported catalyst system of claim 44, wherein the support is MgO.

46. The supported catalyst system of claim 44, wherein the support is Al$_2$O$_3$.

47. The supported catalyst system of claim 44, wherein the support is CeO$_2$.

48. A supported catalyst system comprising the reaction product of a platinum salt, an organic ligand comprising bis-pyrimidyltetrazine (BMTZ), wherein the platinum salt and organic ligand form a ligand/platinum catalyst precursor, and a support to provide the supported catalyst.

49. The supported catalyst system of claim 48, wherein the support is selected from the group consisting of powdered MgO, Al$_2$O$_3$, and CeO$_2$.

50. The supported catalyst system of claim 49, wherein the support is MgO.

51. The supported catalyst system of claim 49, wherein the support is Al$_2$O$_3$.

52. The supported catalyst system of claim 49, wherein the support is CeO$_2$.

53. A process comprising:
(a) contacting a single site catalyst precursor comprising the supported catalyst system of any of claim 43 through 52 with a vinyl terminated alkene and a hydrosilylation agent under hydrosilylation conditions; and (b) hydrosilylating the vinyl terminated alkene to form a hydrosilylated alkyl product.

54. The process of claim 53, wherein the vinyl terminated alkene is 1-octene

55. The process of either claim 53 or claim 54, wherein the hydrosilylation agent comprises dimethoxymethylsilane.

EXAMPLES

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

Synthesis of Pt-PDO/CeO$_2$. 0.0096 g (0.046 mol) PDO (Sigma Aldrich, 98%) were dissolved in 25 mL H$_2$O by stirring for 20 min at room temperature. 0.3 g CeO$_2$ (BET surface area: 4.8 m$^2$/g) were added to the yellow PDO solution and the mixture was then stirred for 2 h at room temperature. 0.0080 g H$_2$PtCl$_6$ 6H$_2$O (Alfa Aesar, 99.95% metal basis, 0.015 mol, 1 wt % by Pt with respect to total catalyst mass; 3 eq. PDO with Pt) were dissolved in 5 mL H$_2$O. The Pt salt solution was then added to the CeO$_2$/PDO/H$_2$O mixture dropwise under stirring within 30 min. The mixture was covered and stirred for 24 h, then dried at room temperature under dry air flow overnight. The dried catalyst was washed with water, then dichloromethane (DCM) until all visible free PDO were removed. Pt-PDO/CeO$_2$ catalyst is a light-yellow powder.

Synthesis of Pt-BMTZ/CeO$_2$. The synthesis of Pt-BMTZ/CeO$_2$ followed a similar procedure with Pt-PDO/CeO$_2$, with the following changes: PDO was replaced by BMTZ (synthesized by the group of Dr. Kenneth Caulton at Indiana University following a method reported in the literature)[68] of the same molar quantity (0.046 mol), and H$_2$O was replaced by Acetone (Macron, 99%) of the same volume.

General procedures for alkene hydrosilylation reactions. For 70° C., 30 min reactions: 30 mg supported Pt catalysts were weighed and kept in an empty reaction tube with cap. 5 mmol dimethoxymethylsilane (Alfa Aesar, >97%) and 6 mmol 1-octene (Alfa Aesar, >97%) were weighed into another reaction tube, and 3 mL toluene (Macron, ACS grade) was added to the same tube. For 60° C., 20 min reactions, the amount of all chemicals was reduced to half. Both tubes were pre-heated in a water bath at the reaction temperature for 10 min, before reactants and solvent were added into the tube with Pt catalysts. The tube was capped during the reaction to avoid evaporation of silane with low boiling point. After the reaction, the tube was cooled down quickly with cold water flow, the solid catalysts were centrifuged out for reuse or post-reaction characterizations, and the liquid mixture was diluted to 25 mL for GC-MS measurements with an Agilent 6890N Gas Chromatograph and 5973 Inert Mass Selective Detector. Product yield was calculated from its response intensity at m/z=203.2 with respect to the response of internal standard decane (Sigma Aldrich, >99%, ~0.15 g added to all standard and post-reaction solutions) at m/z=142.2 using calibration curves pre-made with standard solutions. The product used to make standard solutions was purchased from Sigma Aldrich (≥95.0%). The calibration curve exhibits almost perfect linear relationship between normalized GC-MS response and concentration over the concentration range relevant to the experiments reported here. For all samples, the GC-MS response was measured from decane was within 20% of standard solutions used in the calibration curves. Epoxy-containing alkene substrate hydrosilylation reactions occurred under 80° C., 100 min conditions with 50 mg supported Pt catalyst weighed and kept in an empty reaction tube. 2.5 mmol trimethoxysilane (Sigma Aldrich, 95%) and 3 mmol 4-vinyl-1-cyclohexene 1,2-epoxide isomers (Sigma Aldrich, 98%) were weighed into another reaction tube, and 1.5 mL toluene (Macron, ACS grade) was added to the same tube.

Catalyst characterization. X-ray photoelectron spectroscopy (XPS) measurements were performed with a PHI Versaprobe II XP spectrometer using a monochromated Al X-ray source. A small amount of each powder sample was fixed onto a platen with double-sided tape. XPS were collected at Pt 4f, N 1s, C 1s, Cl 2p, Ce 3d, and O is regions. A neutralizer was used to alleviate surface charging. The binding energy was corrected with adventitious C is peak (284.8 eV). Inductively coupled plasma mass spectrometry (ICP-MS) measurements were performed with an Agilent 7700 quadrupole ICP-MS instrument. Solid catalysts were treated with aqua regia to dissolve all Pt before measurement. For post-reaction solution samples, the solvent was evaporated first and then the residue was treated with aqua regia.

REFERENCES

1. Sommer, L.; Pietrusza, E.; Whitmore, F., Peroxide-catalyzed addition of trichlorosilane to 1-octene. *J. Am. Chem. Soc.* 1947, 69, 188-188.
2. Pierce, O. R.; Kim, Y. K., Fluorosilicones as high temperature elastomers. *Rubber Chem. Technol.* 1971, 44, 1350-1362.
3. Marciniec, B.; Walczuk, E.; Blazejewska-Chadyniak, P.; Chadyniak, D.; Kujawa-Welten, M.; Krompiec, S.; Auner, N.; Weiss, J., Organosilicon Chemistry V—From Molecules to Materials. Wiley VCH, Weinheim 2003.
4. Morita, Y.; Tajima, S.; Suzuki, H.; Sugino, H., Thermally initiated cationic polymerization and properties of epoxy siloxane. *J. Appl. Polym. Sci.* 2006, 100, 2010-2019.
5. Beyou, E.; Babin, P.; Bennetau, B.; Dunogues, J.; Teyssie, D.; Boileau, S., New fluorinated polysiloxanes containing an ester function in the spacer. I. Synthesis and characterization. *J. Polym. Sci., Part A: Polym. Chem.* 1994, 32, 1673-1681.
6. Iojoiu, C.; Abadie, M. J.; Harabagiu, V.; Pinteala, M.; Simionescu, B. C., Synthesis and photocrosslinking of benzyl acrylate substituted polydimethylsiloxanes. *Eur. Polym. J.* 2000, 36, 2115-2123.
7. Li, Z.; Qin, J.; Yang, Z.; Ye, C., Synthesis and structural characterization of a new polysiloxane with second-order nonlinear optical effect. *J. Appl. Polym. Sci.* 2004, 94, 769-774.
8. Sellinger, A.; Laine, R. M.; Chu, V.; Viney, C., Palladium- and platinum-catalyzed coupling reactions of allyloxy aromatics with hydridosilanes and hydridosiloxanes: Novel liquid crystalline/organosilane materials. *J. Polym. Sci., Part A: Polym. Chem.* 1994, 32, 3069-3089.
9. Drazkowski, D. B.; Lee, A.; Haddad, T. S.; Cookson, D. J., Chemical substituent effects on morphological transitions in styrene-butadiene-styrene triblock copolymer grafted with polyhedral oligomeric silsesquioxanes. *Macromolecules* 2006, 39, 1854-1863.
10. Tuchbreiter, A.; Werner, H.; Gade, L. H., "A posteriori" modification of carbosilane dendrimers and dendrons: their activation in core and branch positions. *Dalton Trans.* 2005, 1394-1402.
11. Maciejewski, H.; Wawrzyńczak, A.; Dutkiewicz, M.; Fiedorow, R., Silicone waxes—synthesis via hydrosilylation in homo- and heterogeneous systems. *J. Mol. Catal. A: Chem.* 2006, 257, 141-148.
12. Troegel, D.; Stohrer, J., Recent advances and actual challenges in late transition metal catalyzed hydrosilylation of olefins from an industrial point of view. *Coord. Chem. Rev.* 2011, 255, 1440-1459.
13. Marciniec, B., *Hydrosilylation: a comprehensive review on recent advances*. Springer Science & Business Media: 2008; Vol. 1.
14. Ganicz, T.; Pakula, T.; Stańczyk, W. A., Novel liquid crystalline resins based on MQ siloxanes. *J. Organomet. Chem.* 2006, 691, 5052-5055.
15. Boury, B.; Corriu, R. J.; Leclercq, D.; Mutin, P. H.; Planeix, J. M.; Vioux, A., Poly (vinylsilane): a precursor to silicon carbide. 1. Preparation and characterization. *Organometallics* 1991, 10, 1457-1461.
16. Mori, A.; Sato, H.; Mizuno, K.; Hiyama, T.; Shintani, K.; Kawakami, Y., A facile preparation and polymerization of 1, 1-difunctionalized disiloxanes. *Chem. Lett.* 1996, 25, 517-518.
17. O'brien, M. J., Polyether siloxane copolymer network compositions. U.S. Pat. No. 6,531,540: 2003.
18. Herzig, C.; Deubzer, B.; Huettner, D., Siloxane copolymers containing alkenyl groups, their preparation and use. U.S. Pat. No. 5,241,034: 1993.
19. Jyono, H.; Odaka, H.; Ito, H.; Iwakiri, H., Curable composition. U.S. Pat. No. 6,444,775: 2002.
20. Watabe, T.; Matsumoto, T.; Onoguchi, T.; Tsuruoka, K., Room temperature-setting compositions. U.S. Pat. No. 6,207,766: 2001.
21. Jerschow, P., *Silicone elastomers*. Smart Publications: 2001; Vol. 137.
22. Morris, R. H., Asymmetric hydrogenation, transfer hydrogenation and hydrosilylation of ketones catalyzed by iron complexes. *Chem. Soc. Rev.* 2009, 38, 2282-2291.
23. Langlotz, B. K.; Wadepohl, H.; Gade, L. H., Chiral bis (pyridylimino) isoindoles: A highly modular class of pincer ligands for enantioselective catalysis. *Angew. Chem. Int. Ed.* 2008, 47, 4670-4674.
24. Bart, S. C.; Lobkovsky, E.; Chirik, P. J., Preparation and molecular and electronic structures of iron (0) dinitrogen and silane complexes and their application to catalytic hydrogenation and hydrosilation. *J. Am. Chem. Soc.* 2004, 126, 13794-13807.
25. Vankelecom, I.; Jacobs, P., Dense organic catalytic membranes for fine chemical synthesis. *Catal. Today* 2000, 56, 147-157.
26. Xue, M.; Li, J.; Peng, J.; Bal, Y.; Zhang, G.; Xiao, W.; Lai, G., Effect of triarylphosphane ligands on the rhodium-catalyzed hydrosilylation of alkene. *Appl. Organomet. Chem.* 2014, 28, 120-126.
27. Igarashi, M.; Matsumoto, T.; Kobayashi, T.; Sato, K.; Ando, W.; Shimada, S.; Hara, M.; Uchida, H., Ir-catalyzed hydrosilylation reaction of allyl acetate with octakis (dimethylsiloxy) octasilsesquioxane and related hydrosilanes. *J. Organomet. Chem.* 2014, 752, 141-146.
28. Dong, H.; Jiang, Y.; Berke, H., Rhenium-mediated dehydrogenative silylation and highly regioselective hydrosilylation of nitrile substituted olefins. *J. Organomet. Chem.* 2014, 750, 17-22.
29. Wu, J. Y.; Stanzl, B. N.; Ritter, T., A strategy for the synthesis of well-defined iron catalysts and application to regioselective diene hydrosilylation. *J. Am. Chem. Soc.* 2010, 132, 13214-13216.
30. Glaser, P. B.; Tilley, T. D., Catalytic hydrosilylation of alkenes by a ruthenium silylene complex. Evidence for a new hydrosilylation mechanism. *J. Am. Chem. Soc.* 2003, 125, 13640-13641.
31. Nozakura, S.; Konotsune, S., Cyanoethylation of Trichlorosilane. II. α-Addition. *Bull. Chem. Soc. Jpn.* 1956, 29, 326-331.
32. Bareille, L.; Becht, S.; Cui, J. L.; Le Gendre, P.; Moïse, C., First Titanium-Catalyzed anti-1, 4-Hydrosilylation of Dienes. *Organometallics* 2005, 24, 5802-5806.
33. Harder, S.; Brettar, J., Rational Design of a Well-Defined Soluble Calcium Hydride Complex. *Angew. Chem. Int. Ed.* 2006, 45, 3474-3478.
34. Leich, V.; Spaniol, T. P.; Maron, L.; Okuda, J., Hydrosilylation catalysis by an earth alkaline metal silyl: synthesis, characterization, and reactivity of bis (triphenylsilyl) calcium. *Chem. Commun.* 2014, 50, 2311-2314.
35. Speier, J. L.; Webster, J. A.; Barnes, G. H., The addition of silicon hydrides to olefinic double bonds. Part II. The use of group VIII metal catalysts. *J. Am. Chem. Soc.* 1957, 79, 974-979.
36. Karstedt, B., Platinum complexes of unsaturated siloxanes and platinum containing organopolysiloxanes. U.S. Pat. No. 3,775,452: 1973.
37. Galeandro-Diamant, T.; Zanota, M.-L.; Sayah, R.; Veyre, L.; Nikitine, C.; de Bellefon, C.; Marrot, S.; Meille, V.; Thieuleux, C., Platinum nanoparticles in suspension are as efficient as Karstedt's complex for alkene hydrosilylation. *Chem. Commun.* 2015, 51, 16194-16196.
38. Chauhan, B. P.; Rathore, J. S., Regioselective Synthesis of Multifunctional Hybrid Polysiloxanes Achieved by Pt—Nanocluster Catalysis. *J. Am. Chem. Soc.* 2005, 127, 5790-5791.
39. Bai, Y.; Zhang, S.; Deng, Y.; Peng, J.; Li, J.; Hu, Y.; Li, X.; Lai, G., Use of functionalized PEG with 4-aminobenzoic acid stabilized platinum nanoparticles as an efficient catalyst for the hydrosilylation of alkenes. *J. Colloid Interface Sci.* 2013, 394, 428-433.
40. Stein, J.; Lewis, L.; Gao, Y.; Scott, R., In situ determination of the active catalyst in hydrosilylation reactions using highly reactive Pt (0) catalyst precursors. *J. Am. Chem. Soc.* 1999, 121, 3693-3703.
41. Meister, T. K.; Riener, K.; Gigler, P.; Stohrer, J. r.; Herrmann, W. A.; Kühn, F. E., Platinum Catalysis Revisited—Unraveling Principles of Catalytic Olefin Hydrosilylation. *ACS Catal.* 2016, 6, 1274-1284.
42. Marko, I. E.; Stérin, S.; Buisine, O.; Mignani, G.; Branlard, P.; Tinant, B.; Declercq, J.-P., Selective and efficient platinum (0)-carbene complexes as hydrosilylation catalysts. *Science* 2002, 298, 204-206.
43. Markó, I. E.; Sterin, S.; Buisine, O.; Berthon, G.; Michaud, G.; Tinant, B.; Declercq, J. P., Highly Active and Selective Platinum(0)-Carbene Complexes. Efficient, Catalytic Hydrosilylation of Functionalised Olefins. *Adv. Synth. Catal.* 2004, 346, 1429-1434.
44. Bernhammer, J. C.; Huynh, H. V., Platinum (II) complexes with thioether-functionalized benzimidazolin-2-ylidene ligands: Synthesis, structural characterization, and application in hydroelementation reactions. *Organometallics* 2013, 33, 172-180.

45. Dunsford, J. J.; Cavell, K. J.; Kariuki, B., Expanded ring N-heterocyclic carbene complexes of zero valent platinum dvtms (divinyltetramethyldisiloxane): Highly efficient hydrosilylation catalysts. *J. Organomet. Chem.* 2011, 696, 188-194.

46. Taige, M. A.; Ahrens, S.; Strassner, T., Platinum (II)-bis-(N-heterocyclic carbene) complexes: synthesis, structure and catalytic activity in the hydrosilylation of alkenes. *J. Organomet. Chem.* 2011, 696, 2918-2927.

47. Marciniec, B.; Posala, K.; Kownacki, I.; Kubicki, M.; Taylor, R., New Bis (dialkynyldisiloxane) triplatinum (0) cluster: synthesis, structure, and catalytic activity in olefin-hydrosilylation reactions. *ChemCatChem* 2012, 4, 1935-1937.

48. Downing, C. M.; Kung, H. H., Diethyl sulfide stabilization of platinum-complex catalysts for hydrosilylation of olefins. *Catal. Commun.* 2011, 12, 1166-1169.

49. Sabourault, N.; Mignani, G.; Wagner, A.; Mioskowski, C., Platinum oxide ($PtO_2$): a potent hydrosilylation catalyst. *Org. Lett.* 2002, 4, 2117-2119.

50. Chen, Y. J.; Ji, S. F.; Sun, W. M.; Chen, W. X.; Dong, J. C.; Wen, J. F.; Zhang, J.; Li, Z.; Zheng, L. R.; Chen, C.; Peng, Q.; Wang, D. S.; Li, Y. D., Discovering Partially Charged Single-Atom Pt for Enhanced Anti-Markovnikov Alkene Hydrosilylation. *J. Am. Chem. Soc.* 2018, 140, 7407-7410.

51. Zhu, Y.; Cao, T.; Cao, C.; Luo, J.; Chen, W.; Zheng, L.; Dong, J.; Zhang, J.; Han, Y.; Li, Z.; Chen, C.; Peng, Q.; Wang, D.; Li, Y., One-Pot Pyrolysis to N-Doped Graphene with High-Density Pt Single Atomic Sites as Heterogeneous Catalyst for Alkene Hydrosilylation. *ACS Catal.* 2018, 8, 10004-10011.

52. Chen, L.; Sterbinsky, G. E.; Tait, S. L., Synthesis of platinum single-site centers through metal-ligand self-assembly on powdered metal oxide supports. *J. Catal.* 2018, 365, 303-312.

53. Chen, L.; Ali, I. S.; Sterbinsky, G. E.; Gamler, J. T. L.; Skrabalak, S. E.; Tait, S. L., Alkene Hydrosilylation on Oxide-Supported Pt-Ligand Single-Site Catalysts. *ChemCatChem* 2019, 11, 2843-2854.

54. Huang, Z.; Gu, X.; Cao, Q.; Hu, P.; Hao, J.; Li, J.; Tang, X., Catalytically Active Single-Atom Sites Fabricated from Silver Particles. *Angew. Chem.* 2012, 124, 4274-4279.

55. Fako, E.; Lodziana, Z.; Lopez, N., Comparative single atom heterogeneous catalysts (SAHCs) on different platforms: a theoretical approach. *Catal. Sci. Technol.* 2017, 7, 4285-4293.

56. Chen, Y. X.; Huang, Z. W.; Ma, Z.; Chen, J. M.; Tang, X. F., Fabrication, characterization, and stability of supported single-atom catalysts. *Catal. Sci. Technol.* 2017, 7, 4250-4258.

57. Vilé, G.; Albani, D.; Nachtegaal, M.; Chen, Z.; Dontsova, D.; Antonietti, M.; López, N.; Pérez-Ramírez, J., A Stable Single-Site Palladium Catalyst for Hydrogenations. *Angew. Chem. Int. Ed.* 2015, 54, 11265-11269.

58. Xu, W.; Yu, B.; Zhang, Y.; Chen, X.; Zhang, G.; Gao, Z., Single-site SBA-15 supported zirconium catalysts. Synthesis, characterization and toward cyanosilylation reaction. *Appl. Surf Sci.* 2015, 325, 227-234.

59. Ji, P.; Manna, K.; Lin, Z.; Urban, A.; Greene, F. X.; Lan, G.; Lin, W., Single-Site Cobalt Catalysts at New $Zr_8$ ($\mu_2$-O)8 ($\mu_2$-OH)4 Metal-Organic Framework Nodes for Highly Active Hydrogenation of Alkenes, Imines, Carbonyls, and Heterocycles. *J. Am. Chem. Soc.* 2016, 138, 12234-12242.

60. Schweitzer, N. M.; Hu, B.; Das, U.; Kim, H.; Greeley, J.; Curtiss, L. A.; Stair, P. C.; Miller, J. T.; Hock, A. S., Propylene Hydrogenation and Propane Dehydrogenation by a Single-Site $Zn^{2+}$ on Silica Catalyst. *ACS Catal.* 2014, 4, 1091-1098.

61. Sohn, H.; Camacho-Bunquin, J.; Langeslay, R.; Ignacio-de Leon, P.; Niklas, J.; Poluektov, O.; Liu, C.; Connell, J.; Yang, D.; Kropf, J., Isolated, well-defined organovanadium (III) on silica: single-site catalyst for hydrogenation of alkenes and alkynes. *Chem. Commun.* 2017.

62. Skomski, D.; Tempas, C. D.; Cook, B. J.; Polezhaev, A. V.; Smith, K. A.; Caulton, K. G.; Tait, S. L., Two- and Three-Electron Oxidation of Single-Site Vanadium Centers at Surfaces by Ligand Design. *J. Am. Chem. Soc.* 2015, 137, 7898-7902.

63. Skomski, D.; Tempas, C. D.; Bukowski, G. S.; Smith, K. A.; Tait, S. L., Redox-active on-surface polymerization of single-site divalent cations from pure metals by a ketone-functionalized phenanthroline. *J. Chem. Phys.* 2015, 142, 101913.

64. Skomski, D.; Tempas, C. D.; Smith, K. A.; Tait, S. L., Redox-Active On-Surface Assembly of Metal-Organic Chains with Single-Site Pt(II). *J. Am. Chem. Soc.* 2014, 136, 9862-9865.

65. Tempas, C. D.; Skomski, D.; Cook, B. J.; Le, D.; Smith, K. A.; Rahman, T. S.; Caulton, K. G.; Tait, S. L., Redox Isomeric Surface Structures Are Preferred over Odd-Electron Pt1+. *Chem. Eur. J.* 2018, 24, 15852-15858.

66. Williams, C. G.; Wang, M.; Skomski, D.; Tempas, C. D.; Kesmodel, L. L.; Tait, S. L., Metal-Ligand Complexation through Redox Assembly at Surfaces Characterized by Vibrational Spectroscopy. *J. Phys. Chem. C* 2017.

67. Morris, T. W.; Huerfano, I. J.; Wang, M.; Wisman, D. L.; Cabelof, A. C.; Din, N. U.; Tempas, C. D.; Le, D.; Polezhaev, A. V.; Rahman, T. S.; Caulton, K. G.; Tait, S. L., Multi-electron Reduction Capacity and Multiple Binding Pockets in Metal-Organic Redox Assembly at Surfaces. *Chem. Eur. J.* 2019, 25, 5565-5573.

68. Kaim, W.; Fees, J., The new tetrafunctional pi-acceptor ligand 3,6-bis(2'-pyrimidyl)-1,2,4,5-tetrazine (BMTZ)-diruthenium complexes of BMTZ and of its 1,4-dihydro form. *Z. Naturforsch., B: Chem. Sci.* 1995, 50, 123-127.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A single site catalyst system comprising: (a) a single site catalyst precursor compound and (b) a support, wherein the single site catalyst precursor comprises one or more of the formulae:

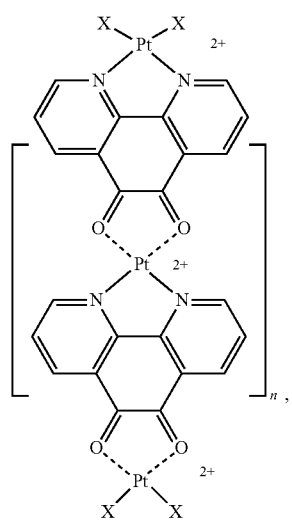

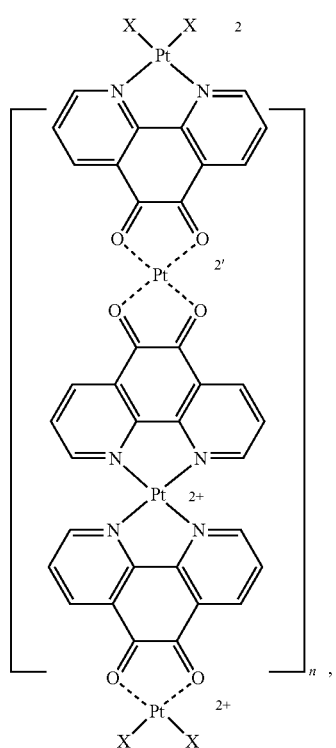

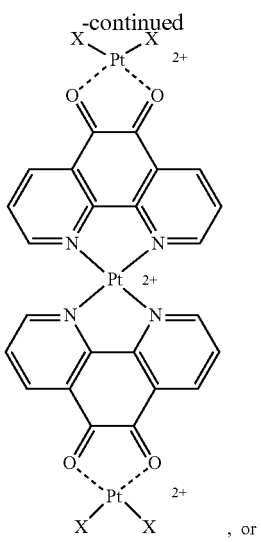

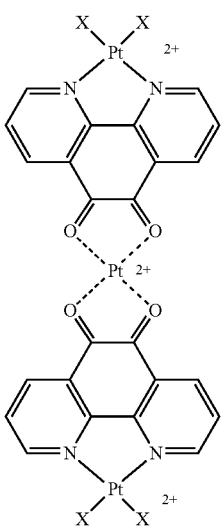

wherein each X, independently, is a halide; and wherein n is 1-5 when present.

2. The single site catalyst system of claim 1, wherein the support is selected from the group consisting of powdered MgO, $Al_2O_3$, and $CeO_2$.

3. The single site catalyst system of claim 2, wherein the support is MgO.

4. The single site catalyst system of claim 2, wherein the support is $Al_2O_3$.

5. The single site catalyst system of claim 2, wherein the support is $CeO_2$.

6. A process comprising:

(a) contacting a single site catalyst precursor comprising one or more of the formulae:

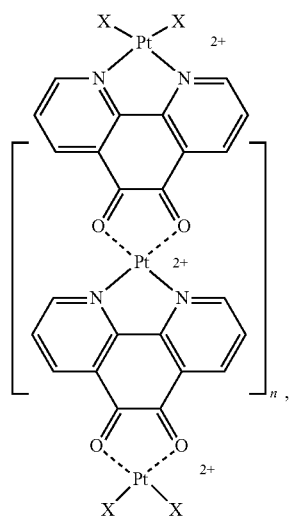

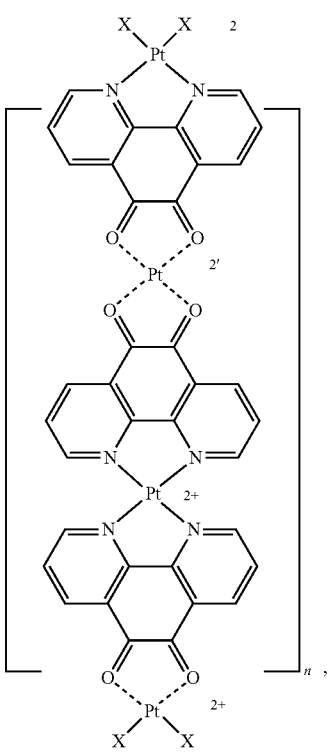

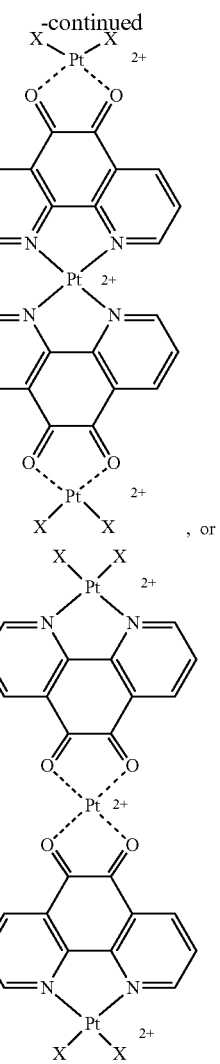

wherein each X, independently, is a halide; and
wherein n is 1-5 when present;

(b) contacting the supported catalyst system, a vinyl terminated alkene and a hydrosilylation agent under hydrosilylation conditions; and (c) hydrosilylating the vinyl terminated alkene to form a hydrosilylated alkyl product.

7. The process of claim 6, wherein the support is selected from the group consisting of powdered MgO, $Al_2O_3$, and $CeO_2$.

8. The process of claim 7, wherein the support is MgO.

9. The process of claim 7, wherein the support is $Al_2O_3$.

10. The process of claim 6, wherein the vinyl terminated alkene is 1-octene.

11. The process of claim 6, wherein the hydrosilylation agent comprises dimethoxymethylsilane.

* * * * *